United States Patent
Song et al.

(10) Patent No.: US 9,059,936 B2
(45) Date of Patent: Jun. 16, 2015

(54) METHOD AND APPARATUS FOR CONTROLLING STREAM TO RECEIVE DATA IN PARALLEL

(75) Inventors: Sunghak Song, Seongnam-si (KR); Kyungeun Woo, Yongin-si (KR); Chang Hoon Lee, Yongin-si (KR); Kyu Sam Oh, Seoul (KR)

(73) Assignee: Samsung SDS Co., Ltd., Seoul (KR)

( * ) Notice: Subject to any disclaimer, the term of this patent is extended or adjusted under 35 U.S.C. 154(b) by 238 days.

(21) Appl. No.: 13/484,909

(22) Filed: May 31, 2012

(65) Prior Publication Data

US 2012/0307636 A1 Dec. 6, 2012

(30) Foreign Application Priority Data

May 31, 2011 (KR) .................. 10-2011-0052405

(51) Int. Cl.
*H04L 12/801* (2013.01)
*H04L 12/825* (2013.01)

(52) U.S. Cl.
CPC ................ *H04L 47/29* (2013.01); *H04L 47/11* (2013.01); *H04L 47/12* (2013.01); *H04L 47/25* (2013.01)

(58) Field of Classification Search
USPC ................ 370/230–235, 242, 465; 709/231
See application file for complete search history.

(56) References Cited

U.S. PATENT DOCUMENTS

| | | | |
|---|---|---|---|
| 7,035,355 B2 | 4/2006 | Lais et al. | |
| 7,295,520 B2 | 11/2007 | Lee et al. | |
| 7,739,331 B2 | 6/2010 | Gu et al. | |
| 2005/0021804 A1 | 1/2005 | Hameleers et al. | |
| 2006/0029037 A1* | 2/2006 | Chen et al. | 370/351 |
| 2008/0313347 A1* | 12/2008 | Kasturi et al. | 709/237 |
| 2010/0112818 A1 | 5/2010 | Zhou et al. | |
| 2012/0033553 A1* | 2/2012 | Strulo et al. | 370/232 |

FOREIGN PATENT DOCUMENTS

EP 2182685 A1 5/2010

OTHER PUBLICATIONS

Communication dated Aug. 9, 2012 issued by the European Patent Office in counterpart European Patent Application No. 12170212.0.
Mehra, et al., "Receiver-Driven Bandwidth Sharing for TCP and its Application to Video Streaming", IEEE Transactions on Multimedia, Aug. 2005, vol. 2, No. 4, pp. 740-752.
Communication dated Jul. 27, 2012 issued by the Korean Intellectual Property Office in counterpart Korean Patent Application No. 10-2011-0052405.
Ito, et al., "On Automatic Parameter Confguration Mechanism for Data Transfer Protocol GridFTP", 7 pgs total.

(Continued)

*Primary Examiner* — Awet Haile
(74) *Attorney, Agent, or Firm* — Sughrue Mion, PLLC

(57) ABSTRACT

Provided are a method and an apparatus for controlling streams to receive data in parallel. The method includes receiving data in parallel using a plurality of connected streams, calculating a network congestion rate using a change in a transmission speed of data received through each of the plurality of streams, adjusting a number of connections of the plurality of streams based on the calculated network congestion rate, and receiving the data in parallel using the adjusted number of streams.

23 Claims, 9 Drawing Sheets

(56) References Cited

OTHER PUBLICATIONS

Communication dated Jul. 22, 2014 issued by the State Intellectual Property Office of the People's Republic of China in counterpart Chinese Patent Application No. 201210176929.0.

Hong-yong Yang et al.; "Analysis of the stability on TCP Vegas congestion control algorithm with feedback delays"; vol. 19; No. 4; Apr. 30, 2004; pp. 372-376; DOI: 10.13195/j.cd.2004.04.12.yanghy.003.

* cited by examiner

- ● : STREAMS IN WHICH TRANSMISSION SPEED IS INCREASED
- × : STREAMS IN WHICH TRANSMISSION SPEED IS REDUCED

- ● : STREAMS IN WHICH TRANSMISSION SPEED IS INCREASED
- × : STREAMS IN WHICH TRANSMISSION SPEED IS REDUCED

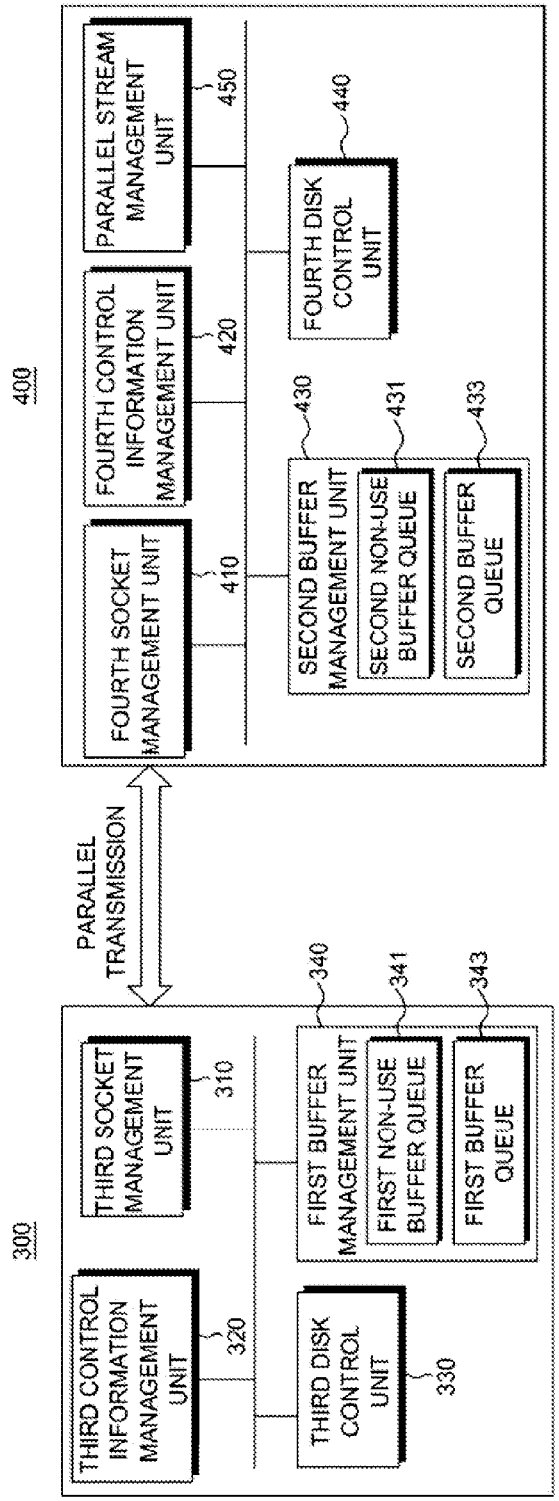

METHOD AND APPARATUS FOR CONTROLLING STREAM TO RECEIVE DATA IN PARALLEL

CROSS-REFERENCE TO RELATED PATENT APPLICATION

This application claims priority from Republic of Korea Patent Application No. 10-2011-0052405 filed on May 31, 2011 in the Intellectual Property Office of the Republic of Korea, the disclosure of which is incorporated herein by reference in its entirety.

BACKGROUND

1. Field

Apparatuses and methods consistent with the exemplary embodiments include a method and an apparatus for controlling streams to receive data in parallel, and, more particularly, to a method and an apparatus for controlling streams to receive data in parallel, which can control the number of connections of parallel streams based on a network congestion rate and a threshold value.

2. Description of the Related Art

With the rapid spread of the use of highly efficient mobile devices has come a phenomenon of reduced transmission speeds for large files. This is because the demands of mobile devices are accommodated within a limited network bandwidth, and also because many mobile devices share that limited network bandwidth. As a result, network response times tend to deteriorate, especially for large file transmissions. One frequently attempted solution has been to upgrade the hardware so as to be able to send and receive data faster. This approach has been helpful, but expensive.

Other solutions focus on the manner in which the data is sent. One file transmission method is to transmit files using only a single transmission control protocol (TCP) stream. In this method, a single TCP stream is set up between a server and a client, in a cloud-based system. Then, data is transmitted through a single channel. However, since such a related-art file transmission method transmits data through a single channel, the transmission efficiency abruptly decreases when the network packet loss rate is high, or when the round trip time (RTT) for the channel is long.

Another approach arose in response to the problems just mentioned. In particular, another related-art file transmission method is to use parallel streams. In this related-art parallel stream approach, however, the number of connections of parallel streams is calculated depending on the packet loss rate and on the RTT. This results in the need to employ a complicated algorithm to calculate how many connections of parallel streams should be used. Unfortunately, a system call has to be made to determine the packet loss rate and the RTT. Since the result of the algorithm depends on the packet loss rate and the RTT, and since these two inputs require a system call, porting the algorithm to different systems requires a modification to the operating system (OS) kernel. Kernel modifications are certainly possible, but this point makes the more widespread development of such a system difficult.

SUMMARY

One or more aspects of the exemplary embodiments provide a method and an apparatus for controlling streams to receive data in parallel, which can adaptively adjust the number of connections of streams according to a network situation, while transmitting data using parallel streams, and exchanging data at an improved speed.

One or more aspects of the exemplary embodiments also provide a method and an apparatus for controlling streams to receive data in parallel, which can adjust the number of connections of streams without calculating packet loss or an RTT separately.

According to an aspect of an exemplary embodiment, there is provided a method for controlling streams to receive data in parallel, the method including: receiving data in parallel using a plurality of connected streams, calculating a network congestion rate using a change in a transmission speed of data received through each of the plurality of streams, adjusting a number of connections of the plurality of streams based on the calculated network congestion rate, and receiving the data in parallel using the adjusted number of streams According to an aspect of another exemplary embodiment, there is provided an apparatus for parallel reception of data, the apparatus including: a communication unit which receives data in parallel using a plurality of streams, and a parallel connection management unit which calculates a network congestion rate using a change in a transmission speed of data received in parallel through each of the plurality of streams, and adjusts a number of connections of the plurality of streams based on the calculated network congestion rate, wherein the communication unit receives the data in parallel using the streams the number of which is adjusted by the parallel connection management unit.

According to another exemplary embodiment, there is provided an apparatus that receives data, the apparatus including: a communication unit, connection management unit, and a memory; wherein: the communication unit receives data, in parallel streams, at a present number of a plurality of connections, and stores the received data at least temporarily in the memory; the connection management unit dynamically calculates a network congestion rate based on a present number of the plurality of connections; the connection management unit uses the calculated network congestion rate to make a determination as to whether to adjust the present number of the plurality of connections; and when the determination to adjust is an affirmative determination, the communication unit issues a change notification indicating a new number of the plurality of connections to be used thereafter.

According to an exemplary embodiment, the network congestion rate can be calculated more easily using a double moving average algorithm without using a packet loss rate and an RTT which are obtained depending on a system call.

Also, according to an exemplary embodiment, since the number of stream connections is increased or reduced according to a result of comparing the network congestion rate and at least one threshold value, the number of stream connections can be adaptively adjusted according to a network situation.

Also, according to an exemplary embodiment, the number of streams is set in consideration of a current network situation without affecting the network situation, so that data can be transmitted in parallel at a highest speed.

Also, according to an exemplary embodiment, since the number of stream connections is controlled based on the transmission speed of the data received using the plurality of streams, it is not necessary to change a kernel of an OS due to a logic process based on an application layer of a network, or a system call such as an RTT or a packet loss rate is not required. Accordingly, high speed parallel transmission of data can be achieved regardless of a type of an OS simply by installing simple software in a server or a device which is to transmit data at a high speed and a server or a device which is to receive data.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and other features and advantages will become more apparent by describing in detail exemplary embodiments with reference to the attached drawings in which:

FIG. 5 is a block diagram illustrating a second data transmitting apparatus and a second data receiving apparatus for parallel transmission of data according to another exemplary embodiment;

DETAILED DESCRIPTION OF EXEMPLARY EMBODIMENTS

Exemplary embodiments will now be described more fully with reference to the accompanying drawings to clarify aspects, features and advantages of the inventive concept. The exemplary embodiments may, however, be embodied in many different forms and should not be construed as limited to the exemplary embodiments set forth herein. Rather, the exemplary embodiments are provided so that this disclosure will be thorough and complete, and will fully convey the scope of the application to those of ordinary skill in the art. It will be understood that when an element, layer or region is referred to as being "on" another element, layer or region, the element, layer or region can be directly on another element, layer or region or there may be intervening elements, layers or regions.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, do not preclude the presence or addition of one or more other components.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the inventive concept.

Figure 1:
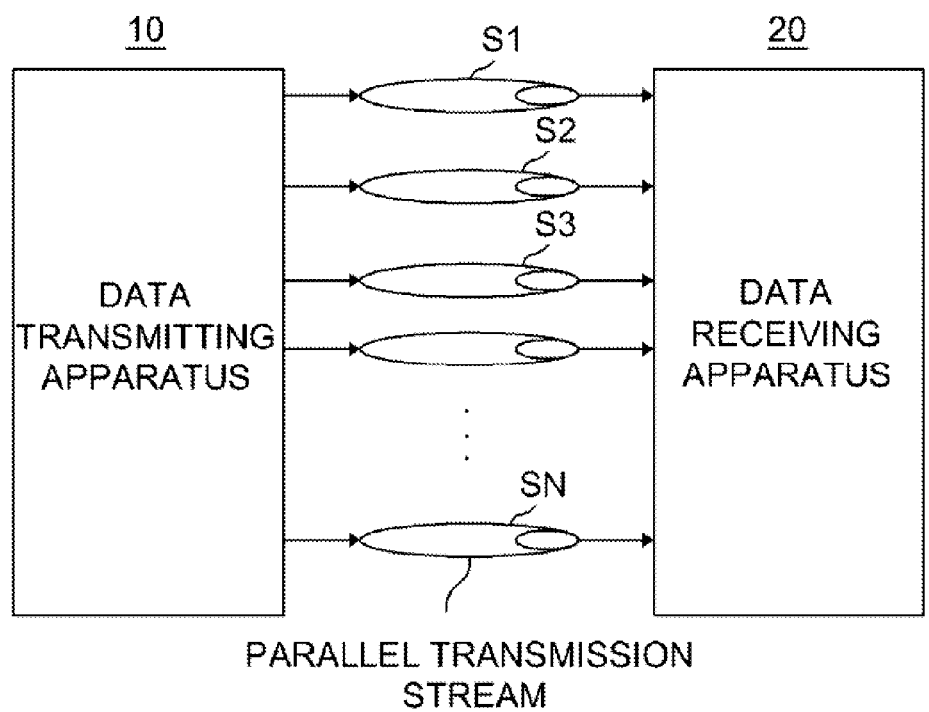
FIG. 1 is a view illustrating a transmitting and receiving system for parallel transmission of data according to an exemplary embodiment.

FIG. 1 is a view illustrating a transmitting and receiving system for parallel transmission of data according to an exemplary embodiment.

Referring to FIG. 1, a transmitting and receiving system for the parallel transmission of data includes a data transmitting apparatus 10 and a data receiving apparatus 20. The data transmitting apparatus 10 may, for example, be a first data transmitting apparatus 100 according to an exemplary embodiment, or a second data transmitting apparatus 300, according to another exemplary embodiment, the particularities of both of which will be described later. The data receiving apparatus 20, likewise, may be, for example, a first data receiving apparatus 200 according to an exemplary embodiment, or a second data receiving apparatus 400, according to another exemplary embodiment, also to be described later.

A plurality of streams S1, S2, . . . , SN (herein, N is an integer) for the parallel transmission of data are provided between the data transmitting apparatus 10 and the data receiving apparatus 20. The plurality of streams S1, S2, . . . , SN may be provided via at least one port but may be realized by multiple channels having different bandwidths. For example, the data transmitting apparatus 10 and the data receiving apparatus 20 may exchange a file with each other in a parallel streaming transmission method through a transmission control protocol (TCP) channel. However, this should not be considered as limiting.

According to an exemplary embodiment, the number of streams S1, S2, . . . , SN connected to transmit data may be increased or reduced, substantially in real time, according to the congestion rate of the network in which the data is transmitted. That is, the number of streams S1, S2, . . . , Sn connected between the data transmitting apparatus 10 and the data receiving apparatus 20 to transmit data may be exponentially increased or linearly reduced based on the network congestion rate.

Figure 2:
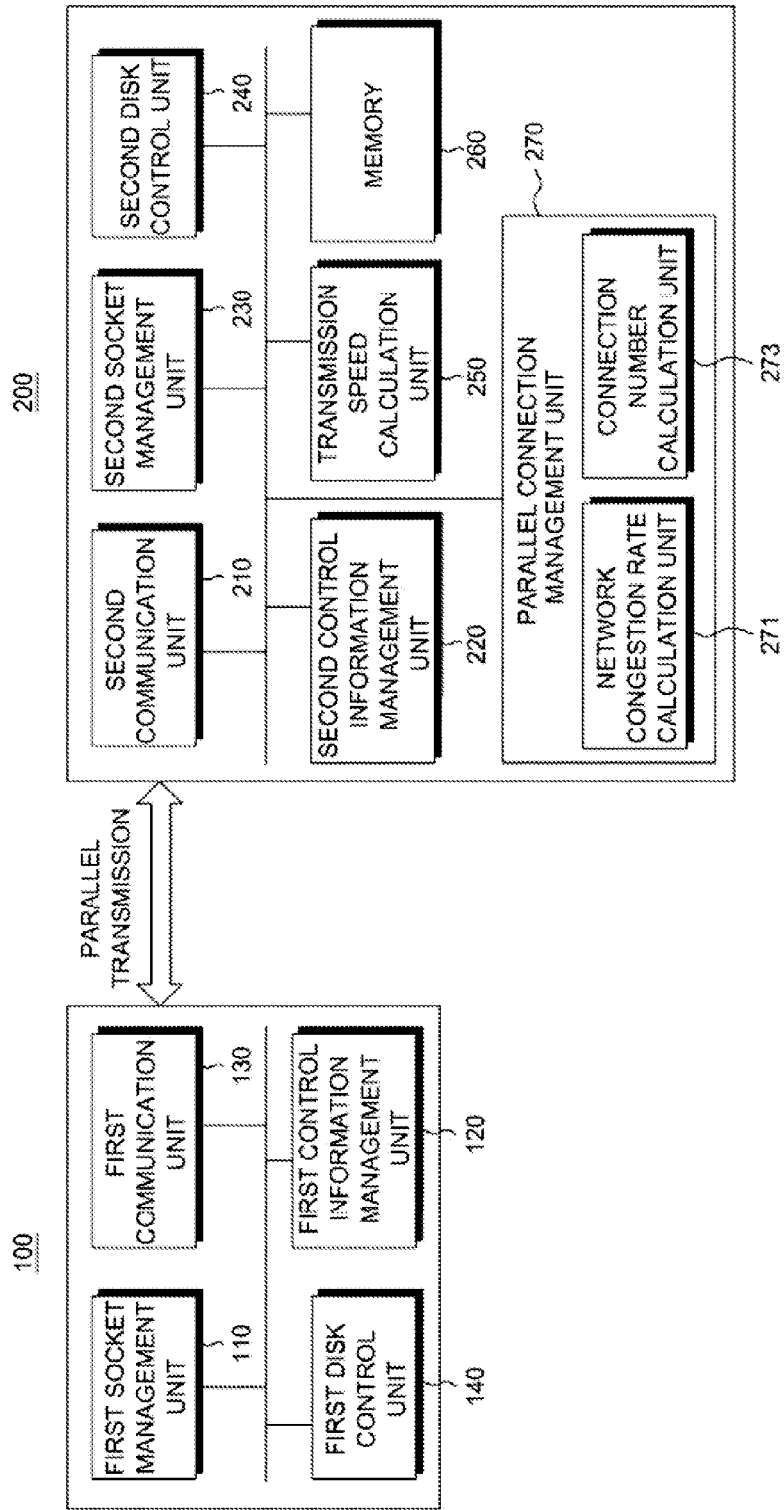
FIG. 2 is a block diagram illustrating a first data transmitting apparatus and a first data receiving apparatus for parallel transmission of data according to an exemplary embodiment.

FIG. 2 is a block diagram illustrating a first data transmitting apparatus and a first data receiving apparatus for parallel transmission of data according to an exemplary embodiment.

Referring to FIG. 2, the first data transmitting apparatus 100 includes a first socket management unit 110, a first control information management unit 120, a first communication unit 130, and a first disk control unit 140.

If a request for transmission of target data is received, the first socket management unit 110 generates a socket to transmit basic control information, including attribute information of the target data, to the first data receiving apparatus 200. The 'socket' mentioned herein is a software-implemented apparatus that connects the first data transmitting apparatus 100 and the first data receiving apparatus 200 to each other so as to transmit target data, and one socket corresponds to one stream. If a plurality of streams is generated, multiple sockets, and multiple channels are formed so that the target data can be transmitted in parallel.

The first socket management unit 110 initially sets, as the number of connections of streams to be used, the maximum number of connections that can use the available bandwidth between the first communication unit 130 and a second communication unit 210. Here, the term 'initially' is used to describe the time at which the target data is initially transmitted to the first data receiving apparatus 200.

When the sockets are generated by the first socket management unit 110, the first control information management unit 120 generates the corresponding basic control information. The basic control information is information that is initially shared by the first data transmitting apparatus 100 and the first data receiving apparatus 200 when it is necessary to transmit target data.

The basic control information may, in an exemplary embodiment, include a file name, a file size, the number of streams, the disk buffer size, the total number of blocks, the socket buffer size, an internet protocol (IP) address, port information, and a session identification (ID) related to the target data to be transmitted. The number of streams, at this time, is the maximum number of connections which was initially set by the first socket management unit 110. The disk buffer size is the size of a block that is assigned to a buffer to write data on a disk. The socket buffer size is the size of the buffer that is used at a kernel end of a transmission protocol. The IP address is the address of the IP that is used to transmit data. The port information is information about the at least one port that is used to transmit data. The session ID is an ID of each stream.

The first communication unit 130 generates a plurality of streams using the available sockets which are generated by the first socket management unit 110 in a number equal to the maximum number of connections, and communicates with the first data receiving apparatus 200 using the generated streams and a pre-defined protocol. The first communication unit 130 uses the streams of the sockets to transmit the basic control information, that was generated by the first control information management unit 120, to the first data receiving apparatus 200. The first communication unit 130 may transmit the basic control information, in one exemplary embodiment, in parallel using the plurality of streams.

After transmitting the basic control information, the first communication unit 130 transmits the target data to the first data receiving apparatus 200, in parallel, using the plurality of streams.

The first disk control unit 140 reads out the target data from a storage medium such as a hard disk drive (HDD), and provides the target data to the first communication unit 130. The first disk control unit 140 may read out the target data by dividing the target data into portions that have respective sizes corresponding to the disk buffer size of the HDD. The first communication unit 130 may transmit the target data to the first data receiving apparatus 200, in parallel, using the maximum number of streams initially set.

It may happen that the number of connections of streams is changed, as will be discussed below. The first data receiving apparatus 200 may, in such a situation, notify the first data transmitting apparatus 100 of the change. That is to say, the first data receiving apparatus 200 may send a change notification message to the first data transmitting apparatus 100. If the first data transmitting apparatus 100 receives such a change notification while the first data transmitting apparatus 100 is in the midst of transmitting the target data, the first socket management unit 110 changes the number of streams from the number that were previously connected to the new number as noticed by the first data receiving apparatus 200. For example, assume an example in which the maximum number of connections included in the basic control information that was sent by the first data transmitting apparatus 100 is 5. Then, the first data receiving apparatus 200 sends a change notification message to the first data transmitting apparatus 100 that the number of available streams is 3. In response, the first socket management unit 110 adjusts the number of available streams to be 3. Accordingly, the first communication unit 130 thereafter transmits the target data in parallel using three streams.

The first data receiving apparatus 200 includes a second communication unit 210, a second control information management unit 220, a second socket management unit 230, a second disk control unit 240, a transmission speed calculation unit 250, a memory 260, and a parallel connection management unit 270.

The second communication unit 210 receives the basic control information from the first data transmitting apparatus 100, and provides the basic control information to the second control information management unit 220.

The second control information management unit 220 parses the basic control information provided from the second communication unit 210 and identifies information included in the basic control information. The second control information management unit 220 sets an environment necessary for receiving the target data, on the basis of the identified information. For example, the second control information management unit 220 informs the second socket management unit 230 of the maximum number of connections and the socket buffer size included in the basic control information. Also, the second control information management unit 220 informs the second disk control unit 240 of the file name, the file size, the disk buffer size, and the total number of blocks. In addition, the second control information management unit 220 informs the second communication unit 210 of the IP address, the port information, and the session ID.

The second socket management unit 230 sets the number of streams to be connected initially on the basis of the maximum number of connections and the socket buffer size provided from the second control information management unit 220. The second socket management unit 230 also generates sockets in a number corresponding to the set number of streams. The second socket management unit 230 may generate a socket having a size corresponding to the socket buffer size. Accordingly, the second communication unit 210 generates streams corresponding to the number of generated sockets. The second communication unit 210 also receives the target data from the first data transmitting apparatus 100, in parallel, using the plurality of streams and a pre-defined protocol. Also, the second communication unit 210 provides the received target data to the second disk control unit 240.

The second disk control unit 240 may store the received target data in a storage medium such as an HDD based on the file name, the file size, the disk buffer size, and the total number of blocks in accordance with the information provided from the second control information management unit 220. In particular, the second disk control unit 240 may temporarily store the target data in a buffer and then store the target data on a disk in a manner that takes into account the disk buffer size and the total number of blocks.

The transmission speed calculation unit 250 may calculate a transmission speed of the target data in each stream, which is received in parallel using the plurality of streams. The transmission speed is affected by the network congestion rate, which is affected by factors such as network traffic. That is, as the network congestion rate is higher, the transmission speed of data is slower; as the network congestion rate is lower, the transmission speed of data is faster. Therefore, the transmission speed calculation unit 250 may calculate the network congestion rate, by way of an estimation, based on the calculated transmission speed. In view of the changing network congestion rate, the number of connections of streams may be adjusted.

Figure 3:
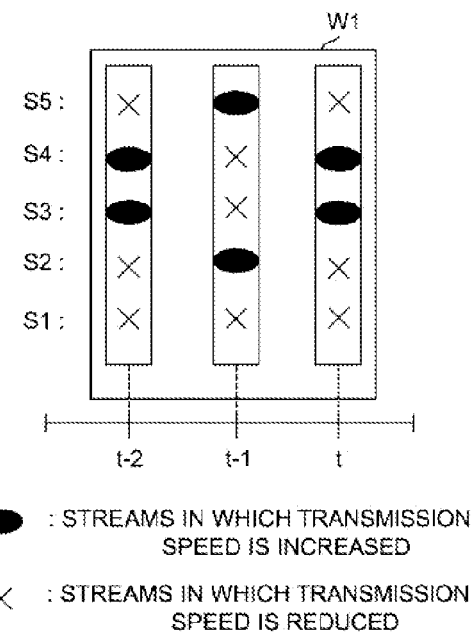
FIG. 3 is a view to explain an example of a unit window.

To achieve this, the transmission speed calculation unit 250 may calculate a transmission speed of the target data in each stream at a pre-defined monitoring time or within a monitoring period. As shown in FIG. 3, t, t−1, and t−2 are monitoring times, and a time interval between a monitoring time and its next monitoring time corresponds to a monitoring period. Since a monitoring time arrives when a monitoring period elapses, the monitoring period and the monitoring time may in certain circumstances be understood to have the same meaning Therefore, hereinafter, the terms, "monitoring period" and "monitoring time" will be interchangeably used.

The memory 260 may be a volatile memory or a non-volatile memory, and may store the transmission speed of the target data, in each stream, as calculated by the transmission speed calculation unit 250, each monitoring time. Table 1 shows an example of the transmission speed of the target data in each stream stored in the memory 260 (streams S4 and S5 are omitted solely for the sake of brevity of illustration):

TABLE 1

| ID of Stream | Monitoring Times | | | | |
|---|---|---|---|---|---|
| | t-4 | t-3 | t-2 | t-1 | t |
| S1 | 600 kbps | 620 kbps | 590 kbps | 610 kbps | 620 kbps |
| S2 | 610 kbps | 500 kbps | 580 kbps | 610 kbps | 610 kbps |
| S3 | 595 kbps | 580 kbps | 580 kbps | 600 kbps | 620 kbps |
| ... | ... | ... | ... | ... | ... |

Referring to table 1, 'bps' is a unit of data transmission speed and is an abbreviation for 'bits per second'. That is, 'bps' is the number of bits transmitted per unit time. At the most recent monitoring time (t), the transmission speed of the target data received through the first stream S1 is 620 kbps, the transmission speed of the target data received through the second stream S2 is 610 kbps, and the transmission speed of the target data received through the third stream S3 is 620 kbps.

The parallel connection management unit 270 calculates the network congestion rate by taking into account any change in the transmission speed of the target data received through each of the plurality of streams. The parallel connection management unit 270 may adjust the number of streams from what was previously set, based on the calculated network congestion rate.

To achieve this, the parallel connection management unit 270 includes a network congestion rate calculation unit 271 and a connection number calculation unit 273.

The network congestion rate calculation unit 271 identifies the transmission speed of the data received through each of the plurality of streams from the memory 260 at every monitoring time, and identifies the number of streams in which the transmission speed has been detected as being reduced in each unit window, based on the identified transmission speed. The network congestion rate calculation unit 271 may calculate the network congestion rate using the number of streams in which the transmission speed is reduced in every unit window.

Specifically, the network congestion rate calculation unit 271 calculates a ratio of reduced streams (that is, a ratio of streams in which a transmission speed is reduced) to the total streams, or to the non-reduced streams, in each unit window, and sets the calculated ratio of reduced streams as a sub-network congestion rate which is a network congestion rate of each unit window. The ratio of the reduced streams is expressed by following equation 1:

$$\text{Ratio of reduced streams} = \frac{\begin{pmatrix} \text{the number of streams in which} \\ \text{the transmission speed is reduced} \end{pmatrix}}{\begin{pmatrix} \text{the total number of streams} \\ \text{used in a unit window} \end{pmatrix}} = \text{sub-network congestion rate}$$ [Equation 1]

The ratio of the reduced streams in equation 1 is a ratio of reduced streams in one unit window and indicates the number of streams in which the transmission speed of the target data is reduced out of the total number of streams used in the unit window. The network congestion rate calculation unit 271 calculates the ratio of the reduced streams, in each unit window, using Equation 1, and sets the calculated ratio as a sub-network congestion rate of each unit window. If the total number of streams used to transmit the target data in a unit window generated at a current monitoring time is 15, and the number of streams in which the transmission speed is reduced is 5, the sub-network congestion rate of the unit window is $$5/15 = 1/3.$$

The network congestion rate calculation unit 271 may use an average, of the sub-network congestion rates calculated in every unit window, as a measure of the overall network congestion rate. The network congestion rate calculation unit 271 may calculate such an average (that is, the network congestion rate) by dividing a sum of the sub-network congestion rates calculated in every unit window by the number of unit windows. The network congestion rate calculation unit 271 may calculate the network congestion rate using Equation 2 as shown below:

$$C_t = \frac{1}{l} \sum_{j=0}^{l-1} \left( \sum_{i=j}^{j+k-1} \frac{n_{t-1}}{a_{t-1}} \right)$$ [Equation 2]

Figure 4A:
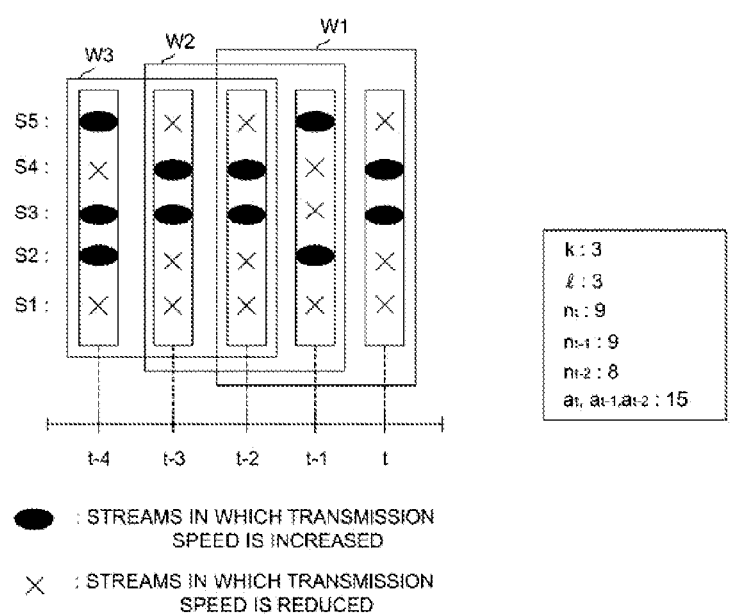
FIG. 4A is a view to explain an example of a method of calculating a network congestion rate using a double moving average algorithm according to an exemplary embodiment.

Referring to Equation 2, $C_t$ is a network congestion rate at a current monitoring time, l is the number of unit windows used to calculate the network congestion rate, and k is the number of monitoring times. $a_t$ is the total number of streams used in each unit window to transmit target data at the current monitoring time and $n_t$ is the number of streams in which the transmission speed is reduced in the unit window corresponding to the current monitoring time. l is the number of unit windows used to calculate the network congestion rate and thus is used to calculate the average of the sub-network congestion rates.

$$\sum_{j=0}^{l-1} \left( \sum_{i=j}^{j+k-1} \frac{n_{t-1}}{a_{t-1}} \right)$$

in equation 2 is a sum of the values of the unit windows, each of which is obtained by dividing the number of streams in which the transmission speed is reduced by the number of streams used in the unit window. In the case of FIG. 4A, which will be described later, $$\frac{9}{15} + \frac{9}{15} + \frac{8}{15} = \frac{26}{15}.$$

Figure 9:
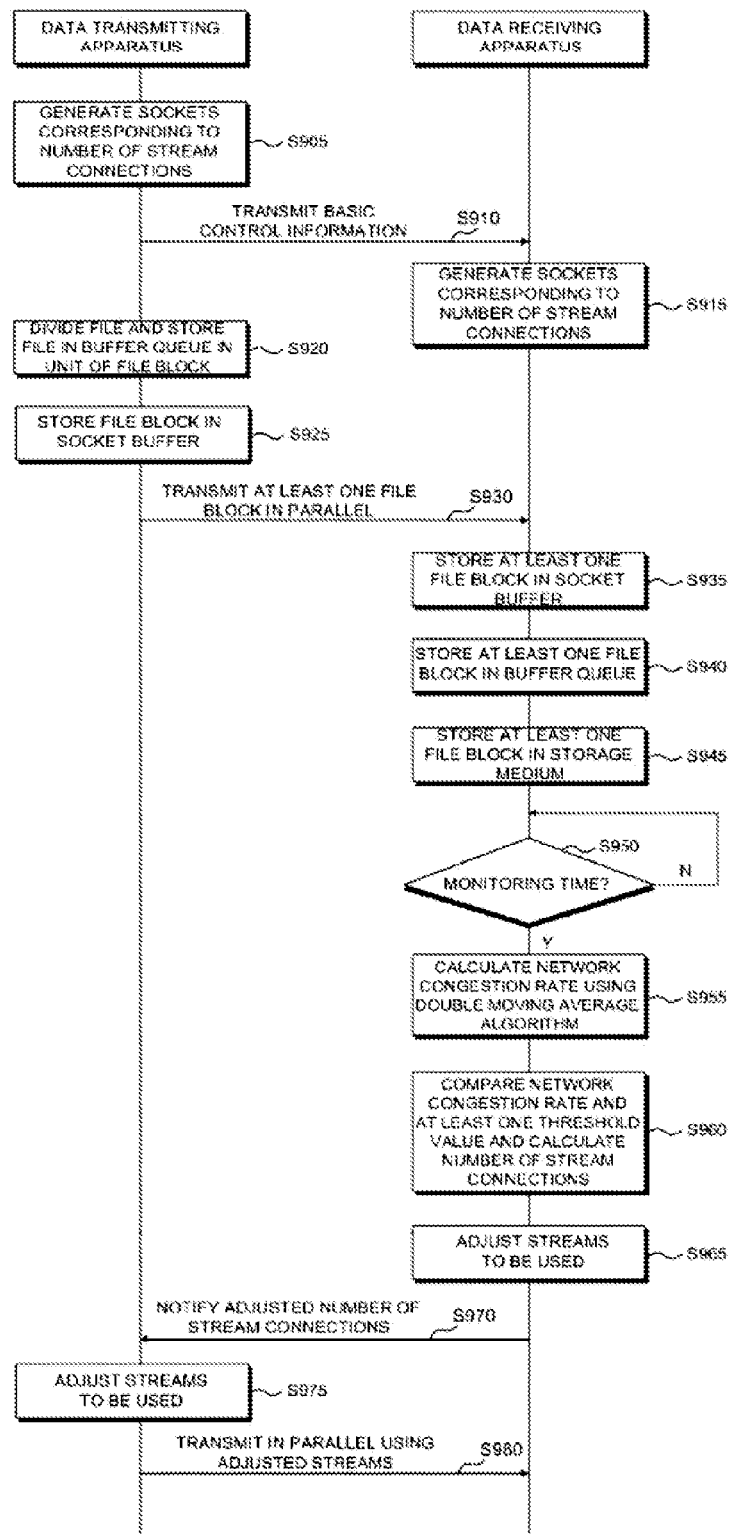
FIG. 9 is a flowchart to explain a method for controlling streams to receive data in parallel according to another exemplary embodiment.

If the total number of streams used in each unit window to transmit the target data is the same in every unit window, equation 2 may simplified to the equation shown in Equation 3:

$$C_t = \frac{1}{l \times a} \sum_{j=0}^{l-1} \left( \sum_{i=j}^{j+k-1} n_{t-1} \right) \qquad \text{[Equation 3]}$$

$$\sum_{j=0}^{l-1} \left( \sum_{i=j}^{j+k-1} n_{t-1} \right)$$

in Equation 3 is a sum of the numbers of streams in which the transmission speed is reduced in every unit window. In the case of FIG. 4A, 9+9+8=26.

The operation of the network congestion rate calculation unit 271, as just explained with reference to exemplary Equations 1 to 3, may be understood to correspond to a double moving average algorithm suggested in the present exemplary embodiment. The double moving average algorithm will be explained below with reference to FIGS. 4A and 4B.

The network congestion rate calculation unit 271 may change the number of unit windows used to calculate the network congestion rate and the monitoring period according to whether a wired network or a wireless network is being used. The situation of the network includes a packet loss rate and a packet round trip time (RTT).

For example, if the network situation deteriorates as the packet loss rate increases or the RTT increases, the network congestion rate calculation unit 271 may increase the monitoring period or may increase the number of unit windows or the number of monitoring times included in the unit window. If the network situation improves, the network congestion rate calculation unit 271 may reduce the monitoring period used to calculate the network congestion rate or, in the alternative, may reduce the number of unit windows or the number of monitoring times included in the unit window. If the network situation is continuously changing, the network congestion rate calculation unit 271 may shorten the monitoring period, and, if the period during which the network situation is changed is relatively prolonged, the network congestion rate calculation unit 271 may extend the monitoring period.

The 'unit window' described above relates to streams which are used during the plurality of monitoring times, and each unit window may be changed, with reference to the monitoring time, by a moving average algorithm. The unit window will be explained in detail below with reference to FIG. 3 and the method of calculating the network congestion rate using a double moving average and Equation 2 will be explained in detail below with reference to FIGS. 4A and 4B.

In an alternative, the connection number calculation unit 273 may exponentially increase or linearly reduce the number of connections of the previously-connected streams, based on the network congestion rate calculated by the network congestion rate calculation unit 271. To achieve this, the connection number calculation unit 273 compares the calculated network congestion rate and at least one set threshold value, and may increase or reduce the number of connections of streams according to a result of the comparison, or in response to the comparison result.

Specifically, if the calculated network congestion rate is less than or equal to a first threshold value (TH1), the connection number calculation unit 273 may exponentially increase the number of connections of plural streams in comparison with the previously set number of connections.

If the calculated network congestion rate is greater than the first threshold value (TH1) but is less than or equal to a second threshold value (TH2), the connection number calculation unit 273 may reduce the number of streams by 1 in comparison with the previous number of connections. Here, the choice of an increment of '1' is just an example and may be set differently according to the engineering needs of a system. Since the change in this situation is merely an increment, it will be understood that this exemplary embodiment with an increment of, e.g., 1, represents an incremental change in the number of streams.

If the calculated network congestion rate is greater than the second threshold value (TH2), but is less than or equal to a third threshold value (TH3), the connection number calculation unit 273 may reduce the number of connections of plural streams by m % (wherein (the number of connections of plural streams×m %) is greater than 1) in comparison with the previous number of connections. 'm' is a constant that satisfies the requirement that (the number of connections of plural streams×m %)≥1. In an exemplary embodiment, 'm' may be one of 10, 20, and 30.

If a result of (the number of connections of plural streams×m %) is expressed by a decimal point, the connection number calculation unit 273 may adjust the number of connections by rounding up or down the result. For example, if a result of (the number of connections of plural streams×m %) is 3.1 and the number of connection of plural streams is 10, 10−3=7 and thus the connection number calculation unit 273 may reduce the number of connections of streams from 10 to 7.

In an exemplary embodiment, the connection number calculation unit 273 may use 0.2 as the first threshold value (TH1), 0.5 as the second threshold value (TH2), and 1 as the third threshold value (TH3). However, this should not be considered as limiting. The number of threshold values used in the connection number calculation unit 273 is not limited to 3, and may be more or fewer than 3. Since the maximum value of the network congestion rate is 1, the maximum value of the third threshold value (TH3) is also 1.

If the number of connected streams is to be adjusted, the parallel connection management unit 270 indicates the adjusted number of streams, or an adjustment to the number of streams, to the second socket management unit 230. The second socket management unit 230 provides an ID of a stream that will be temporarily stopped to the second communication unit 210, with reference to the adjusted number of streams. The second communication unit 210 transmits the provided ID, of the stream to be temporarily stopped, to the first communication unit 130. After that, the first communication unit 130 and the second communication unit 210 may exchange the target data with each other in parallel using the streams other than the temporarily stopped stream.

FIG. 3 is a view illustrating an example of the above-described unit window.

Referring to FIG. 3, 't' is a current monitoring time, 't−1' is a previous monitoring time, and 't−2' is a monitoring time before 't−1'. Another way to put this is to say that the three time values represent a current monitoring time, an immediately preceding time, and another immediately preceding time. Accordingly, a time difference between T and 't−1' corresponds to a monitoring period. In the exemplary embodiment of FIG. 3, a first unit window W1 includes just three monitoring times. Another way to think of W1 is to see that it has 15 streams that are used during the three monitoring times. S1 to S5 are the IDs of the streams that are used to transmit data at every monitoring time. Herein, the number of streams that experienced the reduced speed may be understood to constitute a reduced speed stream count.

The symbol '•' (a blackened circle or oval) indicates a stream in which a transmission speed is increased, constant, or reduced by less than 10% in comparison with an immediately preceding monitoring time. The symbol 'X' indicates a stream in which a transmission speed is reduced by 10% or more in comparison with an immediately preceding monitoring time. It can be seen that the transmission speed of the target data received through the first stream S1 is reduced at the current monitoring time (t) in comparison with the previous monitoring time (t−1). The figure '10%' and the number of monitoring times forming the unit window, that is, 3, should not be considered as limiting.

The total number of streams used in the first unit window W1 is 15, and the number of streams in which the transmission speed of the target data is reduced (that is, the number of symbols 'X') is 9. That is to say, the reduced speed stream count is 9. Accordingly, the ratio of reduced streams of the first unit window W1, that is, the sub-network congestion rate, is calculated with reference to equation 1 as follows:

$$\text{Ratio of reduced streams} = \frac{\text{the number of streams in which the transmission speed is reduced}}{\text{the total number of streams used in a unit window}} = \frac{9}{15}$$

The ratio of reduced streams may be a ratio of the number of streams in which the transmission speed is reduced in the first unit window 1, to the total number of streams in the unit window. Here, "the ratio" means an average of the number of streams in which it is detected that the transmission speed has decreased within a certain time period, i.e., within a unit window.

Figure 4B:
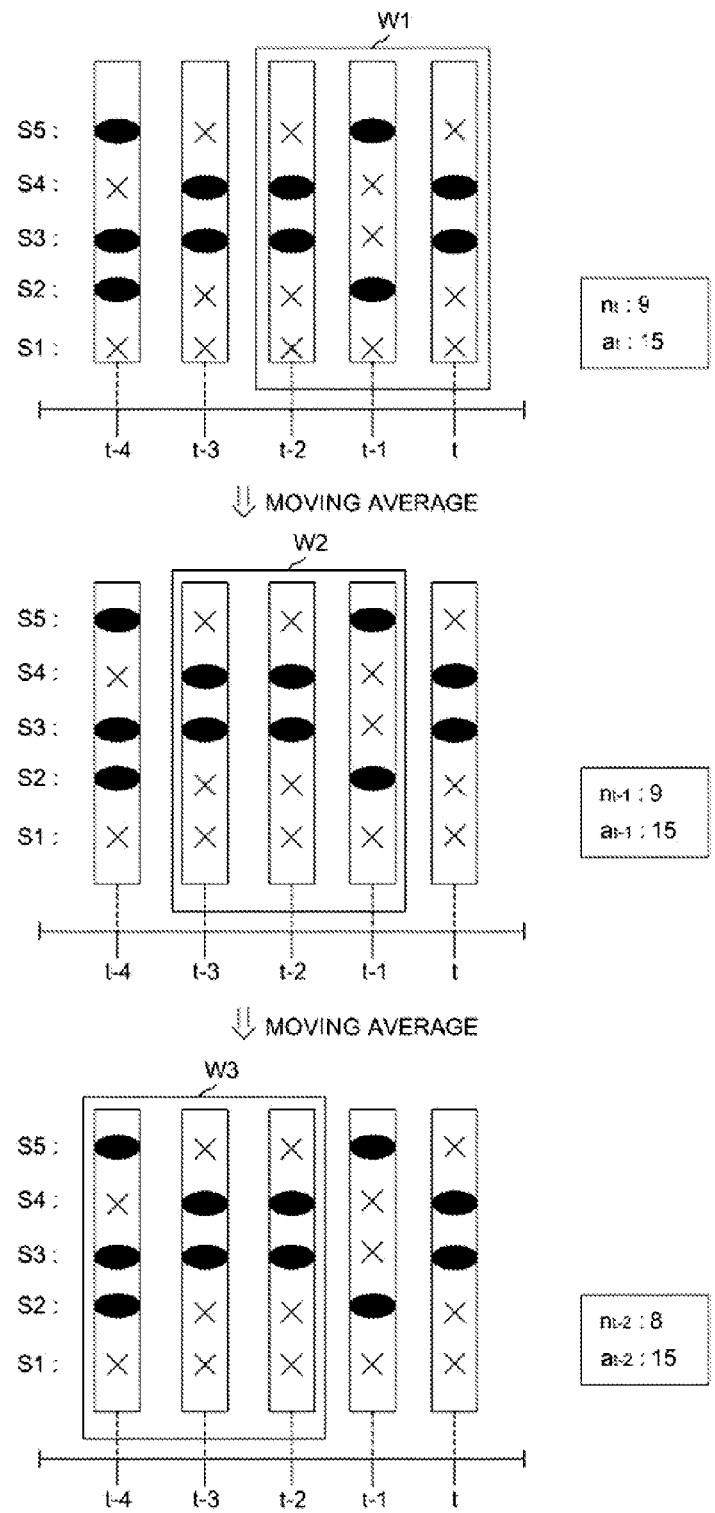
FIG. 4B is a view illustrating first to third unit windows of FIG. 4A.

FIG. 4A is a view to explain an example of a method of calculating a network congestion rate using a double moving average algorithm according to an exemplary embodiment, and FIG. 4B is a view illustrating the first to the third unit windows of FIG. 4A, respectively.

Referring to FIGS. 4A and 4B, 'W1', 'W2', and 'W3' are first, second, and third unit windows, respectively, which are used to calculate a network congestion rate. The first unit window W1 is the same as the unit window described above with reference to FIG. 3. That is, the first unit window W1 has just three monitoring times (t, t−1, t−2). The second unit window W2 is an immediately preceding window of the first unit window W1 and has just three monitoring times (t−1, t−2, and t−3). The third unit window W3 is an immediately preceding window of the second unit window W2 and has just three monitoring times (t−2, t−3, t−4). In other words, W1 may be thought of as a current window of a predetermined number of time samples, and W2 and W3 may be thought of as a plurality of sequentially immediately preceding windows of the current window.

The network congestion rate calculation unit 271 calculates a sub-network congestion rate with respect to the congestion data reflected in each of the first to the third unit windows W1, W2, and W3. To achieve this, the network congestion rate calculation unit 271 uses a double moving average algorithm. The moving average is an average that is obtained while shifting a section, so that a change in a trend can be easily observed. In the case of FIG. 4A, a moving average in the first window W1 is a ratio. This ratio is of the number of streams in which the transmission speed has decreased in the first unit window W1 to the total number of streams in the unit window. This ratio has the same meaning as the ratio of reduced streams or the sub-network congestion rate. The 'double moving average' connotes further calculating an average of the sub-network congestion rates calculated for the unit windows.

Referring to FIG. 4B, a sub-network congestion rate for each of the first to the third unit windows W1, W2, and W3 is calculated.

In the case of the first unit window W1, the total number of streams used to transmit target data ($a_t$) is 15 and the number of streams in which the transmission speed has decreased in the first unit window W1 corresponding to a current monitoring time (t) ($n_t$) is 9. Accordingly, the sub-network congestion rate of the first unit window W1 is $$\frac{9}{15}.$$

In the case of the second unit window W2, the total number of streams used to transmit target data ($a_{t-1}$) is 15, and the number of streams in which the transmission speed has decreased in the second unit window W2, corresponding to a previous monitoring time (t−1) ($n_{t-1}$), is 9. Accordingly, the sub-network congestion rate of the second unit window W2 is $$\frac{9}{15}.$$

The second unit window W2 is logically understood as a shift of the first unit window W1 to the previous monitoring time (t−1), which has a duration the same as the monitoring period, and the sub-network congestion rate of the second unit window W2 is calculated with such a single period shift. Therefore, the sub-network congestion rate of the second unit window W2 is a moving average calculated with respect to the second unit window W2 and with reference to the first unit window W1.

In the case of the third unit window W3, the total number of streams used to transmit target data ($a_{t-2}$) is 15 and the number of streams in which the transmission speed has decreased in the third unit window W3, corresponding to a previous monitoring time (t−2) ($n_{t-2}$), is 8. Accordingly, the sub-network congestion rate of the third unit widow W3 is $$\frac{8}{15}.$$

The network congestion rate calculation unit 271 adds the sub-network congestion rates of the first to the third unit windows W1, W2, and W3, and calculates the network congestion rate by dividing the sum of the sub-network congestion rates by the number of unit windows, that is, 3 unit windows. This is simply illustrated in FIG. 4A.

Referring back to FIG. 4A, the number of monitoring times used within each of the first to the third unit windows W1, W2, and W3 (k) is 3, the number of unit windows used to calculate the network congestion rate (1) is 3, $n_t$ is 9, $n_{t-1}$ is 9, and $n_{t-2}$ is 8. Also, $a_t$, $a_{t-1}$, and $a_{t-2}$ are all 15.

The network congestion rate calculation unit 271 applies the above constants to Equation 1 and calculates the network congestion rate at the current monitoring time (t) as follows:

$$C_t = \frac{1}{l}\sum_{j=0}^{l-1}\sum_{i=j}^{j+k-1}\frac{n_{t-1}}{a_{t-1}} = \frac{1}{3}\sum_{j=0}^{3-1}\sum_{i=j}^{j+3-1}\frac{n_{t-1}}{a_{t-1}} = \frac{1}{3}\times\frac{1}{15}\times(9+9+8) = 0.577$$

As calculated by the above equation, the network congestion rate at the current monitoring time (t) is 0.577. If the second threshold value (TH2) is 0.5 and the third threshold value (TH3) is 1, then the calculated value of 0.577 is between the second threshold value (TH2) and the third threshold value (TH3). Accordingly, the connection number calculation unit 273 calculates the number of streams suitable to a network situation using equation St=St−1×(1−m %). For example, if the number of streams previously used was 10, and if m of m % was previously set to 30 for this adjustment, then it follows that St=St−1×(1−0.3)=10×0.7=7 and thus the connection number calculation unit 273 indicates to the second socket management unit 230 that the calculated number of streams that should be employed is 7. Thus, the number of connections of streams will be changed from 10 to 7.

FIG. 5 is a block diagram illustrating a second data transmitting apparatus and a second data receiving apparatus for parallel transmission of data according to another exemplary embodiment.

Referring to FIG. 5, the second data transmitting apparatus 300 includes a third socket management unit 310, a third control information management unit 320, a third disk control unit 330, and a first buffer management unit 340. The third socket management unit 310, the third control information management unit 320, and the third disk control unit 330 shown in FIG. 5 perform operations similar, respectively, to those already mentioned with respect to the first socket management unit 110, the first control information management unit 120, the first communication unit 130, and the first disk control unit 140 described above with reference to FIG. 2, and thus detailed explanations thereof are omitted.

If a request for the transmission of target data is received, the third socket management unit 310 generates a socket to transmit, to the second data receiving apparatus 400, basic control information including attribute information pertaining to the target data. The 'target data' is data that is to be transmitted to the second data receiving apparatus 400 and may have a particular file format. Accordingly, "the target data" and "the file" may carry substantially the same connotation. Since the target data is explained in FIG. 2 by way of an example, the file will be explained hereinafter by way of an example.

The third socket management unit 310 initially sets the maximum number of connections, that can use an available bandwidth available between the second data transmitting apparatus 300 and the second data receiving apparatus 400, as the number of connections of streams to be initially connected, and generates sockets in accordance with the thus-set maximum number of connections. The third socket management unit 310 generates a plurality of streams, using the sockets generated, in a number corresponding to the maximum number of connections, and transmits a file to the second data receiving apparatus 400, in parallel, using the generated streams and a pre-defined protocol.

If the number of connections of streams is adjusted by the second data receiving apparatus 400 while the file is being transmitted, the third socket management unit 310 adjusts the number of connections of streams from the number previously used to the number given in the notice received from the second data receiving apparatus 400, and thereafter transmits the file to the second data receiving apparatus 400, in parallel, using the adjusted number of streams.

When the plurality of streams are generated by the third socket management unit 310, the third control information management unit 320 generates basic control information. The basic control information is information that is initially shared by the second data transmitting apparatus 300 and the second data receiving apparatus 400, so as to transmit a file.

The third disk control unit 330 reads out the file from a storage medium such as an HDD. This read operation is carried out so as to have a divided file format. The thus read-out data is stored a disk buffer (not shown) in units corresponding to the size of the of divided file units. These are then transmitted from the disk buffer (not shown) to the first buffer management unit 340. This is because the third disk control unit 330 reads out the file by dividing the file into divided file units that each have a size corresponding to the size of the disk buffer (that is, a size of a file block).

The first buffer management unit 340 temporarily stores the divided file units which were input from the disk buffer (not shown) in a buffer that is under the control of the third disk control unit 330.

To achieve this, the first buffer management unit 340 may include a buffer which is divided into a first non-use buffer queue 341 and a first buffer queue 343. The buffer of the first buffer management unit 340 is so divided in order to reuse all areas of the first buffer management unit 340. This is to prevent an overhead of garbage from collecting. Such garbage may collect due to non-reuse of a buffer when, e.g., Java or another OS independent language is used to implement the exemplary embodiment.

The first non-use buffer queue 341 may include a plurality of file blocks for temporarily storing the divided file units which are input from the disk buffer (not shown). One file block stores one divided file unit. The file block may re-divide the divided file unit by a size assigned to the file block, and store the file. In this case, one divided file unit may be stored in the plurality of file blocks, in a dispersed manner. The latter case will be explained below.

If the divided file unit is stored in the file block of the first non-use buffer queue 341, the first buffer management unit 340 may store the file block in the first buffer queue 343.

The first buffer queue 343 temporarily stores the file block input from the first non-use buffer queue 341. The file block stored in the first buffer queue 343 is transmitted to the second data receiving apparatus 400 through a network, and then the used file block is returned to the first non-use buffer queue 341 to be reused. The first non-use buffer queue 341 and the first buffer queue 343 temporarily store at least one file block based on a first-in-first-out (FIFO) method. Thus, these queues are FIFO queues.

Figure 6:
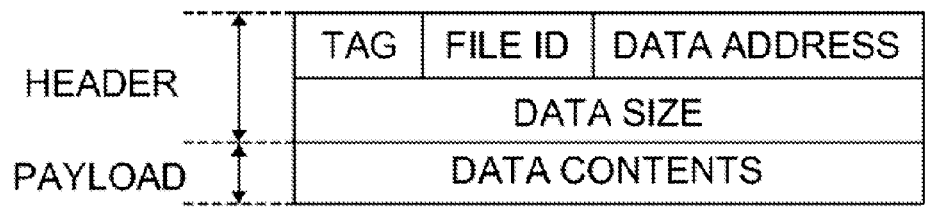
FIG. 6 is a view illustrating a configuration of a file block according to an exemplary embodiment.

FIG. 6 is a view illustrating a configuration of a file block according to an exemplary embodiment.

Referring to FIG. 6, the file block is divided into a header and a payload. The header may include tag information to indicate that the file block is data, ID information to identify a particular file, data address information to indicate from which position of the file the divided file unit is read out by the third socket management unit 310, and data size information of the read-out file (that is, information about the size of the payload). The payload may record real data, which is included in the divided file unit, in an amount corresponding to the size of the payload.

The file block shown in FIG. 6 may be used in the second buffer management unit 430 of the second data receiving apparatus 400 in the same way as in the second data transmitting apparatus 300. Accordingly, the second data receiving apparatus 400 determine the relative position within the file to which the currently received divided file unit belongs, based on the data address information of the file block.

Referring back to FIG. 5, the third socket management unit 310 checks whether there is a file block in the first buffer queue 343, and, if so, it reads out the file block and stores it in a transmission socket buffer (not shown). The third socket management unit 310 may transmit the file block stored in the transmission socket buffer (not shown) to the second data receiving apparatus 400 in parallel using the plurality of streams. The third socket management unit 310 generates the plurality of sockets for parallel transmission as described above, and matches one socket to one stream so that the divided file unit can be transmitted in parallel using the parallel streams.

The third socket management unit 310 may transmit the plurality of file blocks in parallel using the streams or may transmit one file block using the plurality of streams. Hereinafter, the former case will be explained. However, in the latter case, the third socket management unit 310 may divide one file block among as many of the of the streams as there are, and transmit the file block using the plurality of streams. For example, the third socket management unit 310 may divide the file block into a header and a payload and divide the header according to information, and then may transmit the divided data using the plurality of streams.

The second data receiving apparatus 400 includes a fourth socket management unit 410, a fourth control information management unit 420, a second buffer management unit 430, a fourth disk control unit 440, and a parallel stream management unit 450. The fourth socket management unit 410, the fourth control information management unit 420, the fourth disk control unit 440, and the parallel stream management unit 450 shown in FIG. 5 perform operations respectively similar to those of the second communication unit 210, the second socket management unit 230, the second control information management unit 220, the second disk control unit 240, the transmission speed calculation unit 250, and the parallel connection management unit 270 described above with reference to FIG. 2, and thus detailed descriptions thereof are omitted.

The fourth socket management unit 410 receives the basic control information from the second data transmitting apparatus 300, and provides the basic control information to the fourth control information management unit 420.

The fourth control information management unit 420 parses the basic control information, provided from the fourth socket management unit 410, and identifies the specific information included in the basic control information.

The fourth socket management unit 410 sets the number of streams to be connected based on what is indicated in the basic control information. The basic control information may initially indicates a maximum number of connections, as mentioned earlier. The fourth socket management unit 410 generates a number of sockets corresponding to the indicated number of connections. The fourth socket management unit 410 generates streams in a number corresponding to the number of generated sockets, and connects the streams to the third socket management unit 310. The fourth socket management unit 410 receives the file blocks from the second data transmitting apparatus 300, in parallel, using the plurality of streams, and provides the file blocks to the second buffer management unit 430. Each of the file blocks has the configuration as shown in FIG. 6, as was previously described.

The second buffer management unit 430 may include a buffer which is divided into a second non-use buffer queue 431 and a second buffer queue 433.

Whenever a file block received at the fourth socket management unit 410, an empty file block is read out from the second non-use buffer queue 431 and is stored in the second buffer queue 433.

The second buffer queue 433 temporarily stores the file block input from the second non-use buffer queue 431. The second non-use buffer queue 431 and the second buffer queue 433 temporarily store at least one file block based on a FIFO method. That is to say, these are FIFO queues.

The fourth disk control unit 440 may store the received file block in a storage medium such as an HDD. The storage operation may be carried out taking into account the file name, the file size, the disk buffer size, and the total number of blocks, as indicated in the previously received and parsed basic control information. In particular, the fourth disk control unit 440 reads out the file blocks from the second buffer queue 433 and stores them in the storage medium with reference to the disk buffer size and the total number of blocks.

The parallel stream management unit 450 calculates a network congestion rate in every monitoring period in which one or more file blocks are received. The parallel stream management unit 450 adjusts the number of connections, of streams, based on the network congestion rate that it calculates.

To achieve this, the parallel stream management unit 450 may calculate a file block transmission speed for the file block, received in parallel using the plurality of streams, in each of the streams at every monitoring time, and may store the transmission speed in a memory (not shown). The parallel stream management unit 450 may calculate the network congestion rate using the double moving average algorithm, previously described, above, with reference to FIGS. 4A and 4B. Briefly, the parallel stream management unit 450 identifies the transmission speed of the file blocks received through each of the plurality of streams during each monitoring period, and identifies the number of streams in which the transmission speed has decreased in every unit window. The parallel stream management unit 450 may calculate the network congestion rate using the number of streams in which the transmission speed has decreased. The parallel stream management unit 450 compares the calculated network congestion rate and pre-set threshold values, and may exponentially increase or linearly reduce the previously set number of connections.

The parallel stream management unit 450 provides information about the adjusted number of streams to the fourth socket management unit 410.

The fourth socket management unit 410 may change the number of streams to be actually used in response to the indication of the number of connections provided from the parallel stream management unit 450. For example, if the number of streams is reduced from 5 to 3, the fourth socket management unit 410 may determine three streams from among the five streams and may receive file blocks using the determined streams.

Figure 7:
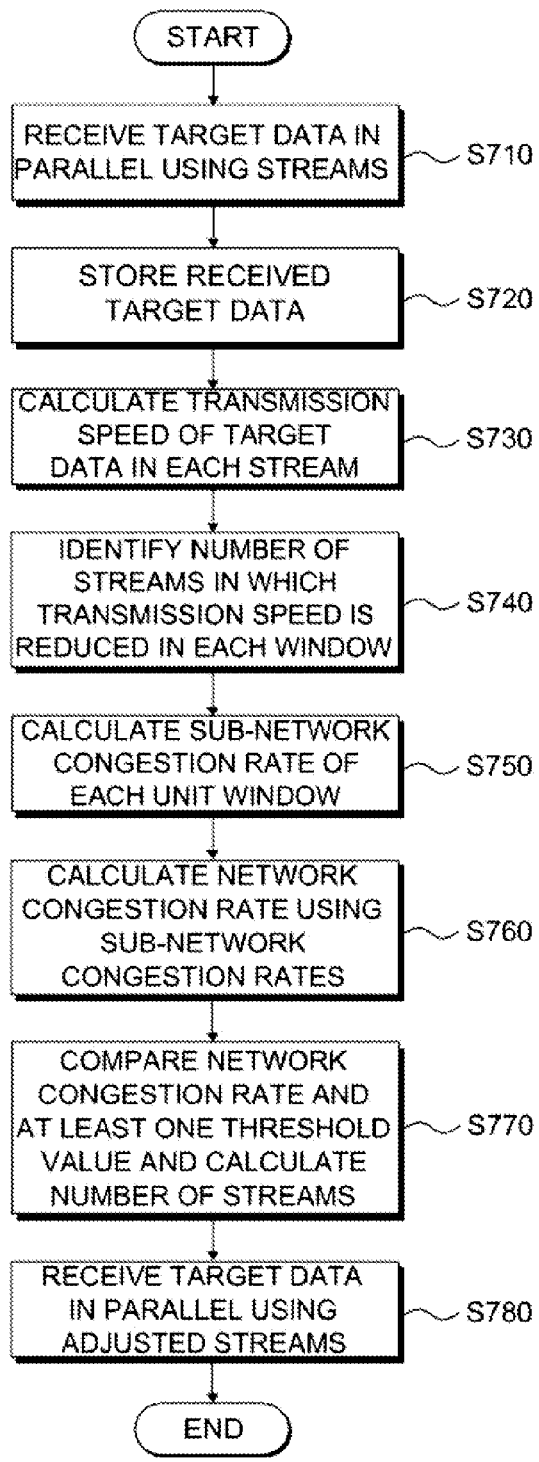
FIG. 7 is a flowchart to explain a method for controlling streams to receive data in parallel according to an exemplary embodiment.

FIG. 7 is a flowchart illustrating a method for controlling streams to receive data, in parallel, according to an exemplary embodiment.

A data receiving apparatus to perform the stream controlling method of FIG. 7 may, for example, be the first data receiving apparatus 200 of FIG. 2, or the second data receiving apparatus 400 of FIG. 5.

The data receiving apparatus receives target data from a data transmitting apparatus in parallel through sockets forming a plurality of streams (S710). The data transmitting apparatus may, for example, be the first data transmitting apparatus 100 of FIG. 2 or the second data transmitting apparatus 300 of FIG. 5.

The data receiving apparatus stores the target data received, in parallel, in a storage medium (S720).

The data receiving apparatus calculates the transmission speed of the target data received through each of the streams in operation S710. The data receiving apparatus stores the transmission speed in a memory (S730). The data receiving apparatus may calculate the transmission speed in each of the streams during every monitoring period, that is, at every monitoring time at which a network congestion rate is set to be calculated.

The data receiving apparatus compares the transmission speed in each of the streams, calculated at a current monitoring time in operation S730, and a transmission speed calculated at a previous monitoring time, and identifies the number of streams in which the transmission speed has decreased (S740). At this time, the data receiving apparatus may identify the number of streams in which the transmission speed has decreased in each unit window.

The data receiving apparatus calculates a sub-network congestion rate, which is a network congestion rate in each unit window, using the number of streams in which the transmission speed has decreased in each unit widow (S750). The data receiving apparatus calculates a ratio of the reduced streams (indicating the number of streams in which the transmission speed is reduced) to the total number of streams used in each unit window, using Equation 1, and sets the calculated ratio of reduced streams as the sub-network congestion rate of the unit window. The data receiving apparatus calculates the sub-network congestion rate for each of the unit windows.

The data receiving apparatus obtains an average of the sub-network congestion rates of the unit windows calculated in operation S750, and sets the average as the network congestion rate at the current monitoring time (S760). The average of the sub-network congestion rates may be obtained by dividing the sum of the sub-network congestion rates by the number of unit windows.

The data receiving apparatus compares the network congestion rate (calculated in operation S760) and at least one threshold value, and calculates the number of streams suitable to the current network situation (S770). The data receiving apparatus may, e.g., exponentially increase or linearly reduce the number of streams to be used based on the calculated network congestion rate. Operation S770 will be explained in more detail below with reference to FIG. 8.

Returning to FIG. 7, the data receiving apparatus adjusts the number of streams, to be used to receive the target data in parallel, according to the number of streams calculated in operation S770, and receives the target data from the data transmitting apparatus in parallel using the adjusted number of streams (S780). The data transmitting apparatus may be notified, of the adjusted number of streams, by the data receiving apparatus and may thereafter adjust the number of streams on the basis of the notification.

Figure 8:
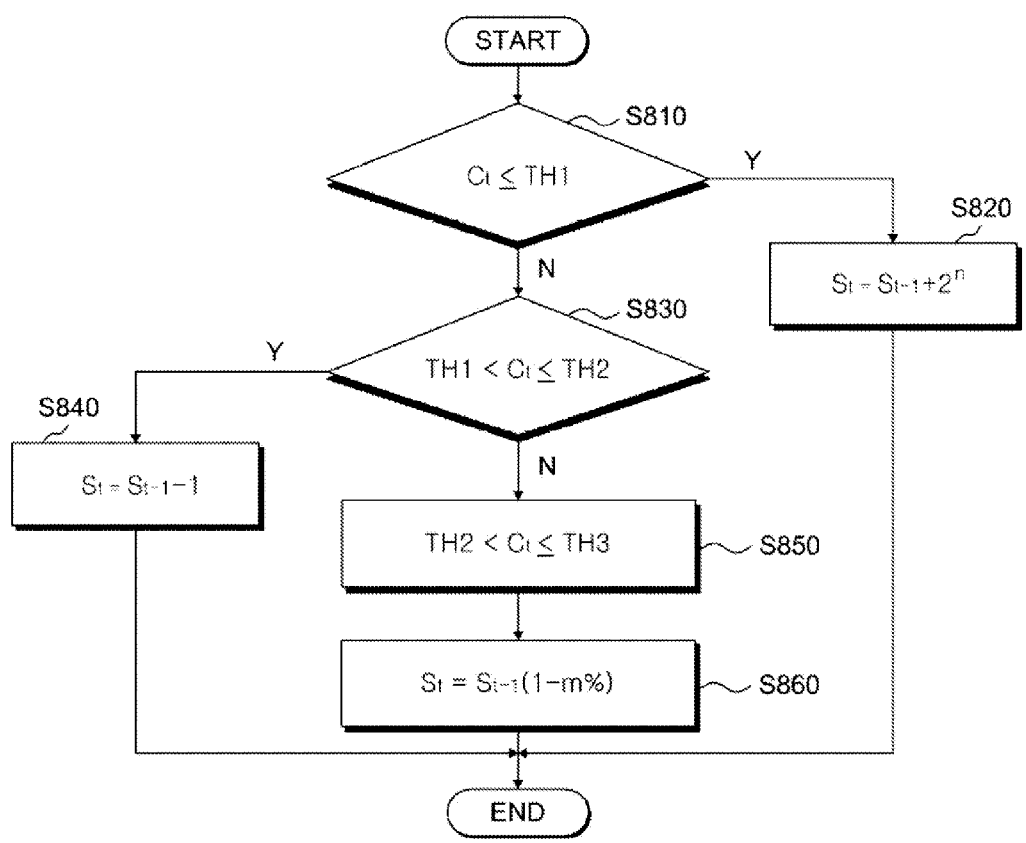
FIG. 8 is a flowchart to explain a method for calculating the number of stream connections described in operation S770 of FIG. 7.

FIG. 8 is a flowchart illustrating one implementation of operation S770 of FIG. 7, to calculate the number of streams.

Referring to FIG. 8, the data receiving apparatus compares the network congestion rate (Ct) calculated in operation S760 and a first threshold value (TH1) (S810). Here, 't' of the network congestion rate (Ct) connotes a current monitoring time.

If the network congestion rate (Ct) is less than or equal to the first threshold value (TH1) (S810-Y), the data receiving apparatus may exponentially increase the number of connected streams ($S_{t-1}$) (S820). In FIG. 8, '$S_{t-1}$' indicates the number of streams used in receiving the target data in operation S710, that is, the number of streams previously set, '$S_t$' indicates the increased number of streams, and 'n' is a natural number, for example, 1. However, 'n' is adaptively changeable according to a network situation.

If the network congestion rate (Ct) is greater than the first threshold value (TH1) (S810-N), the data receiving apparatus compares the network congestion rate (Ct) and a second threshold value (TH2) (S830).

If the network congestion rate (Ct) is greater than the first threshold value (TH1), but is less than or equal to the second threshold value (TH2) (S830-Y), the data receiving apparatus may reduce the number of connected streams ($S_{t-1}$) by 1 (S840).

On the other hand, if the network congestion rate (Ct) is greater than the second threshold value (TH2) but is less than or equal to a third threshold value (TH3) (S850-Y), the data receiving apparatus may reduce the number of connected streams ($S_{t-1}$) by m %. 'm' is a constant that satisfies (the number of a plurality of streams×m %)≥1. For example, if m=30 and the number of streams ($S_{t-1}$) is 10, 10×30%=3. Thus, the data receiving apparatus in such a scenario would reduce 10 streams by 3 so as to use only 7 streams.

FIG. 9 is a flowchart illustrating a method for controlling streams to receive data in parallel, according to another exemplary embodiment.

A data transmitting apparatus and a data receiving apparatus to perform the stream controlling method of FIG. 9 may, e.g., be the first data transmitting apparatus 100 and the first data receiving apparatus 200 of FIG. 2 or the second data transmitting apparatus 300 and the second receiving apparatus 400 of FIG. 5.

If a request for transmission of a file is received, the data transmitting apparatus determines the number of streams so as to be able to use all the available bandwidth, and generates sockets in a number corresponding to the number of streams (S905).

The data transmitting apparatus transmits the previously mentioned basic control information, including attribute information about the file, to the data receiving apparatus, using at least one socket (S910).

The data receiving apparatus sets an environment for reception of the file, based on the basic control information received in operation S910 (S915). For example, the data receiving apparatus may set the number of streams to be connected, and generate sockets corresponding to the set number of streams (the number of streams having been based on the maximum number of connections and a socket buffer size of the basic control information).

The data transmitting apparatus reads out the file from a storage medium, such as an HDD, in a divided file format, and stores the divided file units in a buffer queue, in units of file blocks (S920). The buffer queue may be constituted as the first non-use buffer queue 341 and the first buffer queue 343 of FIG. 5.

The data transmitting apparatus reads out at least one file block (stored in the buffer queue in operation S920) and stores the file block in a transmission socket buffer (S925).

The data transmitting apparatus transmits the at least one file block, stored in the transmission socket buffer, to the data receiving apparatus, in parallel, using the plurality of streams generated in operation S905 (S930).

The data receiving apparatus stores the file block, received in parallel in operation S930, in a reception socket buffer (S935).

The data receiving apparatus temporarily stores the at least one file block stored in the reception socket buffer in a buffer queue (S940). The buffer queue may, e.g., be constituted as the second non-use buffer queue 431 and the second buffer queue 433 of FIG. 5.

The data receiving apparatus stores the at least one file block, stored in the buffer queue, in a storage medium such as an HDD (S945).

While receiving the file blocks from the data transmitting apparatus, in parallel, and storing the file blocks in the storage medium, that is, during operations S935 to 945, the data receiving apparatus identifies a monitoring period or a monitoring time (S950).

When the duration of the monitoring period expires (S950-Y), the data receiving apparatus calculates the network congestion rate using, e.g., a double moving average algorithm (S955). The data receiving apparatus may, for example, calculate the network congestion rate using the method described in operations S730 to S760 of FIG. 7 or the method described with reference to FIGS. 4A and 4B.

The data receiving apparatus compares the network congestion rate, calculated in operation S955, and at least one threshold value, and calculates the number of streams (St) suitable to the current network situation (S960). The data receiving apparatus may calculate the number of streams (St) using the method described with reference to FIG. 8.

The data receiving apparatus adjusts the number of streams to be actually used, using the number of streams (St) calculated in operation S960 (S965).

The data receiving apparatus notifies the adjusted number of streams (St) to the data transmitting apparatus (S970).

The data transmitting apparatus adjusts the number of streams to be used to transmit the target data, in parallel, based on the notified number of streams (St) (S975).

The data transmitting apparatus thereafter transmits the file in parallel using the number of streams as adjusted in number in operation S975 (S980).

One or more of the exemplary embodiments thus prevent or ameliorate a deterioration in a transmission speed which may be caused by the ineffective use of the available network bandwidth when a file is transmitted in a related-art method such as a file transfer protocol (FTP) method in a wide area network (WAN), and makes more efficient use of the bandwidth by transmitting a file in a multiplexing manner through multiple channels using parallel TCP, which is a software algorithm, and, as a result, improves the file transmission speed.

Also, one or more of the exemplary embodiments suggest an algorithm to control the number of stream connections, based on a double moving average, in order to dynamically control the transmission speed in response to network congestion, when transmitting a file at a high speed through parallel TCP, and solves a bandwidth occupation problem of a related-art software-based high speed transmission method.

The above-described exemplary embodiments may be applicable to any and all fields for transmitting data at a high speed. For example, the exemplary embodiments may be applicable to web sites, or to programs that exchange a media file (a moving picture, a photo, music) with one another, or apparatuses that exchange a high capacity 3D movie file with one another at a remote distance. The exemplary embodiments may be utilized in back up or file transmission between data centers located away from each other. In addition, there is no particular requirement that the file content be fixed beforehand, and so the inventive concept may be applicable in the case of a real-time streaming broadcast of live data, or the like.

While exemplary embodiments have been particularly shown and described above, it will be understood by those of ordinary skill in the art that various changes in form and details may be made therein without departing from the spirit and scope of the inventive concept as defined by the following claims.

What is claimed is:

1. A method for controlling streams to receive data in parallel, the method comprising:
   receiving data, in parallel, over a plurality of connected streams;
   calculating a network congestion rate using a change in a transmission speed of data received through the plurality of streams;
   adjusting a number of connections of the plurality of streams, based on the calculated network congestion rate; and
   receiving the data in parallel over an adjusted number of the plurality of connected streams,
   wherein the calculating of the network congestion rate comprises:
   calculating a respective sub-network congestion rate based on a change in the transmission speed of the data in each of a plurality of unit windows, each of the plurality of unit windows including one or more monitoring periods during which the transmission speed of the data received through each of the plurality of streams is identified; and
   calculating an average of each of the respective sub-network congestion rates and using the average as the network congestion rate.

2. The method as claimed in claim 1, wherein the adjusting of the number of connections of the plurality of streams comprises:
   adjusting the number of connections of the plurality of streams based on the calculated network congestion rate, and includes at least one of:
   exponentially increasing the number of connections; or
   linearly reducing the number of connections.

3. The method as claimed in claim 1, wherein the adjusting of the number of connections of the plurality of streams comprises:
   making a comparison of the calculated network congestion rate and at least one threshold value; and
   adjusting the number of connections according to a result of the comparison.

4. The method as claimed in claim 3, wherein, in response to the calculated network congestion rate being less than or equal to a first threshold value, the number of connections is adjusted by exponentially increasing the number of connections.

5. The method as claimed in claim 1, wherein an initial number of the connections of streams allowed to receive the data in parallel is set to a maximum number of connections that can be used in a presently available bandwidth.

6. The method as claimed in claim 1, wherein the transmission speed of the data received through the plurality of streams comprises a number of bits transmitted in a predetermined unit of time.

7. A method for controlling streams to receive data in parallel, the method comprising:
receiving data, in parallel, over a plurality of connected streams;
calculating a network congestion rate using a change in a transmission speed of data received through the plurality of streams;
adjusting a number of connections of the plurality of streams, based on the calculated network congestion rate; and
receiving the data in parallel over an adjusted number of the plurality of connected streams,
wherein the calculating of the network congestion rate comprises:
identifying the transmission speed of the data received over each of the plurality of streams during one or more monitoring periods defining one or more unit windows;
performing an identification, in each of the one or more unit windows, to identity ones of the plurality of streams in which the transmission speed of the data has decreased, to obtain a decreased speed stream count; and
calculating the network congestion rate based on the reduced speed stream count, and
wherein the calculating of the congestion rate based on the reduced speed stream count, comprises:
for each of the one or more unit windows, calculating a ratio of the reduced speed stream count to the total number of streams used, as a sub-network congestion rate; and
averaging the calculated sub-network congestion rate for each of a plurality of the one or more unit windows to obtain the network congestion rate.

8. The method as claimed in claim 7, wherein the calculating of the network congestion rate further comprises:
calculating the transmission speed of the data received through the plurality of streams, at each of the one or more monitoring periods, and
storing the transmission speed.

9. A method for controlling streams to receive data in parallel, the method comprising:
receiving data, in parallel, over a plurality of connected streams;
calculating a network congestion rate using a change in a transmission speed of data received through the plurality of streams;
adjusting a number of connections of the plurality of streams, based on the calculated network congestion rate; and
receiving the data in parallel over an adjusted number of the plurality of connected streams,
wherein the adjusting of the number of connections of the plurality of streams comprises:
making a comparison of the calculated network congestion rate and at least one threshold value; and
adjusting the number of connections according to a result of the comparison, and
wherein:
in response to the calculated network congestion rate being less than or equal to a first threshold value, the number of connections is adjusted by exponentially increasing the number of connections,
in response to the calculated network congestion rate being greater than the first threshold value but is less than or equal to a second threshold value, the number of connections of the plurality of streams is reduced by 1, and
in response to the calculated network congestion rate being greater than the second threshold value but less than or equal to a third threshold value, the number of connections of the plurality of streams is reduced by m % in comparison with a current number of connections, wherein the number of connections of the plurality of streams multiplied by the m % is greater than 1.

10. An apparatus for parallel reception of data, the apparatus comprising:
a parallel connection management unit configured to calculate, using a processor, a network congestion rate using a change in a transmission speed of data received in parallel through each of a plurality of streams, and adjust a number of connections of the plurality of streams based on the calculated network congestion rate; and
a communication unit configured to receive the data in parallel using the streams, the number of which is adjusted by the parallel connection management unit,
wherein the parallel connection management unit:
is configured to calculate a respective sub-network congestion rate based on a change in the transmission speed of the data in each of a plurality of unit windows, each of the plurality of unit windows including one or more monitoring periods during which the transmission speed of the data received through each of the plurality of streams is identified; and
is configured to calculate an average of each of the respective sub-network congestion rates and uses the average as the network congestion rate.

11. The apparatus as claimed in claim 10, wherein the parallel connection management unit comprises a connection number calculation unit configured to adjust the number of streams based on the calculated network congestion rate by performing at least one of:
exponentially increasing the number of connections, or
linearly reducing the number of connections.

12. The apparatus as claimed in claim 10, wherein the parallel connection management unit comprises a connection number calculation unit which:
is configured to make a comparison of the calculated network congestion rate and at least one threshold value; and
is configured to adjust the number of connections according to a result of the comparison.

13. The apparatus as claimed in claim 12, wherein, in response to the calculated network congestion rate being less than or equal to a first threshold value, the connection number calculation unit is configured to adjust the number of connections by exponentially increasing the number of connections.

14. The apparatus as claimed in claim 10, further comprising a socket management unit configured to set an initial number of the connections of the streams allowed to receive the data in parallel to a maximum number of connections that can be used in a presently available bandwidth available in the communication unit.

15. An apparatus for parallel reception of data, the apparatus comprising:
a parallel connection management unit configured to calculate, using a processor, a network congestion rate using a change in a transmission speed of data received in parallel through each of a plurality of streams, and adjust a number of connections of the plurality of streams based on the calculated network congestion rate; and a communication unit configured to receive the data in parallel using the streams, the number of which is adjusted by the parallel connection management unit, wherein the parallel connection management unit includes a network congestion rate calculation unit configured to identify the transmission speed of the data received through each of the plurality of streams during each of a plurality of monitoring periods, and wherein the network congestion rate calculation unit:
is configured to calculate the network congestion rate based on a decreased speed stream count within one or more unit windows, taken over the plurality of monitoring periods;
is configured to calculate a ratio of the decreased speed stream count to a total number of streams used in each unit window, in every one of the one or more unit windows;
is configured to use the ratio as a sub-network congestion rate each unit window; and
is configured to determine the network congestion rate by dividing a sum of the sub-network congestion rates by a number of the one or more unit windows.

16. The apparatus as claimed in claim 15, further comprising:
a transmission speed calculation unit configured to calculate the transmission speed of the data received through the plurality of streams, during each of the one or more monitoring periods; and
a memory configured to store each calculated transmission speed.

17. An apparatus for parallel reception of data, the apparatus comprising:
a parallel connection management unit configured to calculate, using a processor, a network congestion rate using a change in a transmission speed of data received in parallel through each of a plurality of streams, and adjust a number of connections of the plurality of streams based on the calculated network congestion rate; and
a communication unit configured to receive the data in parallel using the streams, the number of which is adjusted by the parallel connection management unit,
wherein the parallel connection management unit comprises a connection number calculation unit which:
is configured to make a comparison of the calculated network congestion rate and at least one threshold value; and
is configured to adjust the number of connections according to a result of the comparison,
wherein:
in response to the calculated network congestion rate being less than or equal to a first threshold value, the connection number calculation unit is configured to adjust the number of connections by exponentially increasing the number of connections;
in response to the calculated network congestion rate being greater than the first threshold value but less than or equal to a second threshold value, the connection number calculation unit is configured to reduce the number of connections of the plurality of streams by 1; and
in response to the calculated network congestion rate being greater than the second threshold value but less than or equal to a third threshold value, the connection number calculation unit is configured to reduce the number of connections of the plurality of streams by m % in comparison with a current number of connections, wherein the number of connections of the plurality of streams multiplied by the m % is greater than 1.

18. An apparatus that receives data, comprising:
a communication unit, connection management unit, and a memory;
wherein:
the communication unit is configured to receive data, in parallel streams, at a present number of a plurality of connections, and store the received data at least temporarily in the memory;
the connection management unit is configured to dynamically calculate, using a processor, a network congestion rate based on a present number of the plurality of connections;
the connection management unit is configured to use the calculated network congestion rate to make a determination as to whether to adjust the present number of the plurality of connections;
in response to the determination to adjust being an affirmative determination, the communication unit is configured to issue a change notification indicating a new number of the plurality of connections to be used thereafter; and
the connection management unit is configured to calculate the network congestion rate based upon a local calculation made with respect to at least a current window of a predetermined number of time samples and a plurality of sequentially immediately preceding windows of the current window.

19. The apparatus as set forth in claim 18, wherein the local calculation is based on a reduced speed stream count pertaining to the present number of the plurality of connections, taken at each of the predetermined number of time samples of the current window.

20. The apparatus as set forth in claim 18, wherein the local calculation is based on a reduced speed stream count pertaining to the present number of the plurality of connections, taken at each of the predetermined number of time samples of the current window and also of the plurality of sequentially immediately preceding windows.

21. The apparatus as set forth in claim 18, wherein, in response to the determination of the connection management unit to adjust the present number of the plurality of connections, the new number of the plurality of connections to be used is based on a comparison of the network congestion rate with one or more thresholds.

22. The apparatus as set forth in claim 21, wherein the new number of the plurality of connections to be used has a relation to the present number of the plurality of connections, such that at least one of the following is true:
the new number represents an exponential increase over the present number;
the new number represents a linear decrease from the present number; or
the new number represents an incremental change from the present number.

23. The apparatus as set forth in claim 18, further comprising a storage to which the received data is written.

* * * * *